United States Patent [19]

Takano

[11] Patent Number: 5,534,891
[45] Date of Patent: Jul. 9, 1996

[54] ELECTRONIC EQUIPMENT HAVING DISPLAY UNIT AND OPERATION INPUT UNIT

[75] Inventor: Hirokuni Takano, Kawasaki, Japan

[73] Assignee: Canon Kabushiki Kaisha, Tokyo, Japan

[21] Appl. No.: 138,381

[22] Filed: Oct. 20, 1993

Related U.S. Application Data

[63] Continuation of Ser. No. 888,476, May 22, 1992, abandoned, which is a continuation of Ser. No. 533,431, Jun. 5, 1990, abandoned.

[30] Foreign Application Priority Data

Jun. 8, 1989 [JP] Japan .................. 1-144213

[51] Int. Cl.$^6$ .................. G09G 5/00; H05K 5/00
[52] U.S. Cl. .................. 345/169; 361/680; 361/681; 400/681
[58] Field of Search .................. 345/905, 168, 345/169, 157; 341/20, 22; 248/919, 920, 921, 923, 922; 312/208; 400/83, 84, 682, 681, 683; 361/680, 681, 679, 686, 727; 364/708.1, 708.09, 708.12

[56] References Cited

U.S. PATENT DOCUMENTS

| 4,565,343 | 1/1986 | Lake, Jr. et al. | 248/919 |
| 4,718,740 | 1/1988 | Cox | 312/208 |
| 4,730,364 | 3/1988 | Tat-Kee | 340/700 |

FOREIGN PATENT DOCUMENTS 2140073  11/1984  United Kingdom .

OTHER PUBLICATIONS

IBM Technical Disclosure Bulletin, "Six-Point Huge Mechanism" by IBM Corp., vol. 28, No. 6 pp. 2476–2477, issued on Nov. 1985.

*Primary Examiner*—Steven Saras
*Attorney, Agent, or Firm*—Fitzpatrick, Cella, Harper & Scinto

[57] ABSTRACT

Electronic equipment has a display unit and an operation input unit. The display unit is arranged to be pivotal between a state wherein it obliquely stands on an electronic equipment main body (tilt state), and a state wherein it is folded on the equipment main body (close state), and the operation input unit is arranged to be pivotal between a state wherein it is inclined with respect to the electronic equipment main body, and a horizontal state. The operation input unit is interlocked with the pivotal movement of the display unit. When the display unit is pivoted to the tilt state, the operation input unit is pivoted to the inclined state. When the display unit is pivoted to the close state, the operation input unit is pivoted to the horizontal state.

18 Claims, 2 Drawing Sheets

ELECTRONIC EQUIPMENT HAVING DISPLAY UNIT AND OPERATION INPUT UNIT

This application is a continuation of application Ser. No. 07/888,476, filed May 22, 1992, which is a continuation of application Ser. No. 07/533,431, filed Jun. 5, 1990, now both abandoned.

BACKGROUND OF THE INVENTION

1. Field of the Invention

The present invention relates to a housing structure of electronic equipment having a display unit and an operation input unit.

2. Related Background Art

A lap-top wordprocessor or personal computer as electronic equipment of this type employs a structure wherein a display unit comprising a liquid crystal display device or the like, and a keyboard as an operation input unit are attached to an equipment main body. In a most popular structure, the display unit is arranged to be pivotal between a state wherein it obliquely stands up on the equipment main body (to be referred to as a tilt state hereinafter), and a state wherein it is folded on the equipment main body (to be referred to as a close state hereinafter). FIG. 3 shows such a conventional structure of an equipment.

The structure shown in FIG. 3 includes a display unit 1 comprising, e.g., a liquid crystal display device, a housing 2 for the display unit, a keyboard 4 as an operation input means, a housing 5 for an electronic equipment main body, and a PCB (printed circuit board) 6 provided with an electronic circuit of the electronic equipment main body.

The display unit housing 2 is arranged on the main body housing 5 to be pivotal about a shaft 3 as a fulcrum in directions of arrows c and e. The keyboard 4 is fixed to and supported on a plurality of bosses 7 projecting from the bottom surface of the main body housing 5, and is inclined downward from the rear side to the front side to improve operability.

In this structure, when the electronic equipment is used, the housing 2 of the display unit 1 is pivoted in the direction c to a position indicated by an alternate long and short dashed line in FIG. 3 to be set in the above-mentioned tilt state. In this state, the keyboard 4 is operated.

When the electronic equipment is not used, the housing 2 of the display unit is pivoted in the direction e to be set in the closed state indicated by a solid line. As a result, the overall structure can be rendered compact, and the display unit 1 and the keyboard 4 can be protected.

According to the structure shown in FIG. 3, however, since the keyboard 4 is inclined, the total height of the electronic equipment in the closed state requires the extra height corresponding to an inclination of the keyboard 4. In FIG. 3, the total height of the electronic equipment in the closed state 1 is indicated by A+α. A is the height of the electronic equipment when the keyboard 4 is horizontally arranged, and α is an increase in height due to inclination of the keyboard 4.

When the keyboard is inclined in this manner, the total height of the electronic equipment is increased, and it is difficult to obtain a low-profile electronic equipment. However, if the keyboard is horizontally arranged to attain a low-profile structure, operability of the keyboard is impaired.

SUMMARY OF THE INVENTION

It is an object of the present invention to provide low-profile electronic equipment without impairing operability of an operation input unit in electronic equipment of this type.

In order to achieve the above object, when a display unit is folded on an electronic equipment main body, an operation input unit is set in a substantially horizontal state with respect to the electronic equipment main body, thus providing a structure free from an increase in height due to inclination of the operation input unit in terms of the height of the electronic equipment main body. Thus, the height of the electronic equipment main body can be decreased.

When the display unit stands up on the electronic equipment main body, i.e., in use of the electronic equipment, the operation input unit is set in an inclined state with respect to the electronic equipment main body, thereby assuring good operability of the operation input unit.

DETAILED DESCRIPTION OF THE PREFERRED EMBODIMENT

An embodiment of the present invention will be described in detail below with reference to the accompanying drawings.

Figure 1:
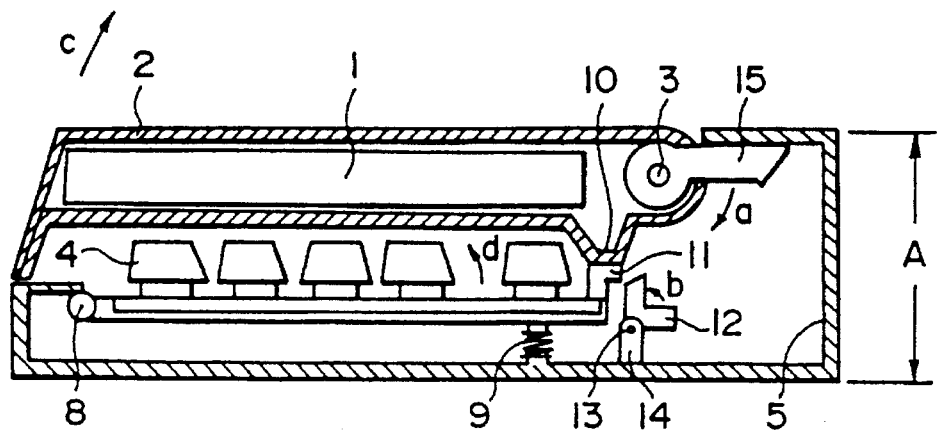
FIG. 1 is a schematic sectional view of a closed state of an electronic equipment according to an embodiment of the present invention.
Figure 2:
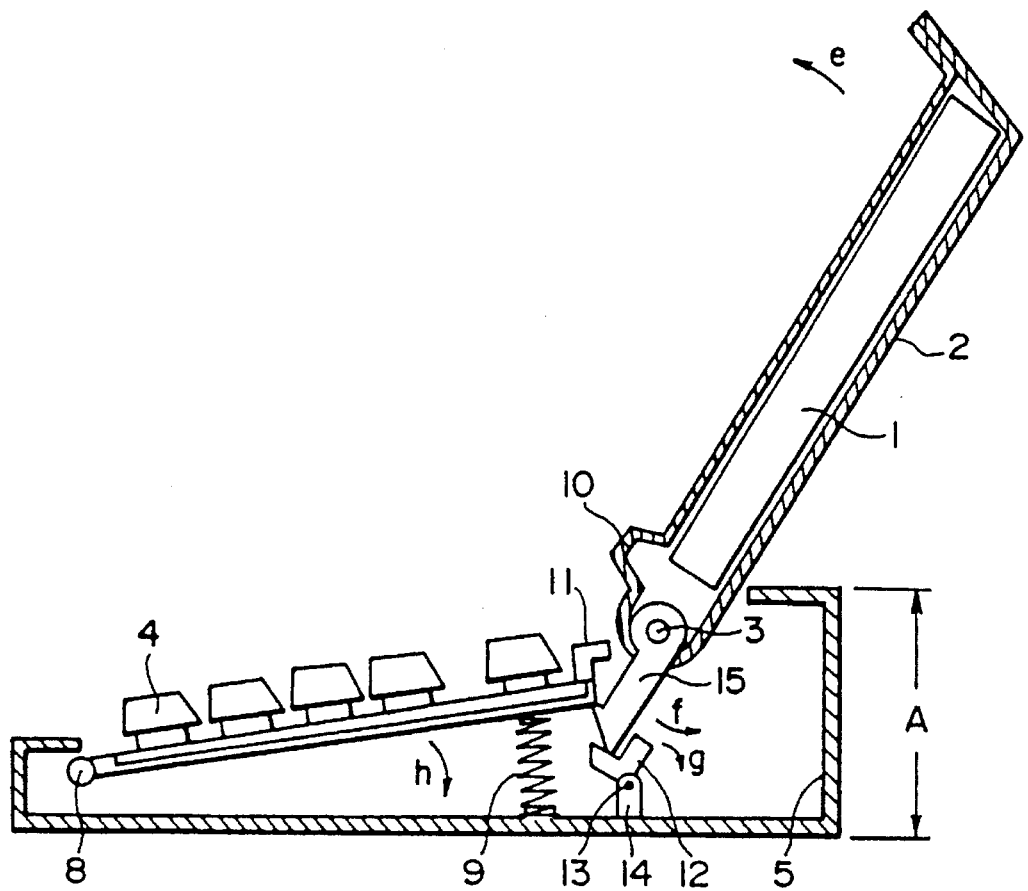
FIG. 2 is a schematic sectional view of a tilt state of the electronic equipment shown in FIG. 1.

FIGS. 1 and 2 are for explaining a structure of electronic equipment according to an embodiment of the present invention, and are schematic sectional views of the electronic equipment in closed and tilt states of a display unit described above. In FIGS. 1 and 2, the same or corresponding parts are denoted by the same reference numerals in FIG. 3 of the prior art. A description of portions of this embodiment common to the prior art will be omitted, and only differences from the prior art will be explained below.

As shown in FIGS. 1 and 2, in the structure of this embodiment, a housing 2 of a display unit 1 is arranged on a main body housing 5 to be pivotal about a shaft 3 as a fulcrum in directions of an arrow c in FIG. 1 and an arrow e in FIG. 2 as in the prior art.

In contrast to this, a keyboard 4 is not fixed as in the prior art. The keyboard 4 is arranged on the main body housing 5 to be pivotal about a shaft 8 as a fulcrum in directions of an arrow d in FIG. 1 and an arrow h in FIG. 2 at a left end portion in FIG. 1 as a front side upon operation.

The keyboard 4 is horizontally held with respect to the main body housing 5 in the closed state shown in FIG. 1, as will be described later. In the tilt state shown in FIG. 2, the keyboard 4 is supported to be inclined downward from the rear side to the front side.

A spring 9 is elastically inserted between the lower surface of the free end portion of the keyboard 4 and the bottom surface of the main body housing 5. In the closed state shown in FIG. 1, the spring 9 is compressed and pushes the keyboard 4 upward. In the tilt state shown in FIG. 2, the spring 9 is expanded, and pulls the keyboard 4 downward.

A boss 11 having an L-shaped section projects from the upper surface of the free end portion of the keyboard 4.

A difference between the housing 2 of the display unit 1 and the prior art is that a pressing portion 10 having a trapezoidal section projects from the inner proximal end portion of the housing 2. In the closed state shown in FIG. 1, the pressing portion 10 is brought into contact with the boss 11 of the keyboard 4, and presses it downward.

A hook-like keyboard support member (to be simply referred to as a support member hereinafter) 15 for supporting the keyboard 4 in the tilt state is axially supported on the shaft 3 as the fulcrum of the housing 2 to be pivotal in directions of an arrow a in FIG. 1 and an arrow f in FIG. 2, as will be described later. The support member 15 is engaged with the housing 2, and is pivoted together with the housing 2 upon a pivotal movement of the housing 2.

Another distinction from the prior art is that a keyboard support base (to be simply referred to as a support base hereinafter) 12 for supporting the keyboard 4 in the tilt state is arranged below the shaft 3 in the main body housing 5, as will be described later. The support base 12 is attached to the upper end portion of a boss 14 projecting from the bottom surface of the housing 5, and is pivotal about a shaft 13 as a fulcrum in directions of an arrow b in FIG. 1 and an arrow g in FIG. 2.

The operation of the above-mentioned structure will be described below.

In the closed state, i.e., in an unused state in FIG. 1, the housing 2 of the display unit 1 is pivoted to a horizontally folded state with respect to the main body housing 5. The keyboard 4 is apt to be pivoted in the direction d since it is biased by the spring 9. However, the keyboard 4 is pressed by the pressing portion 10 which is in contact with the boss 11, and is held in a horizontal state with respect to the main body housing 5.

In order to set the usable tilt state from this closed state, the housing 2 of the display unit 1 is pivoted in the direction of the arrow c in FIG. 1. Upon this pivotal movement, the pressing portion 10 is pivoted, and after it presses the boss 11 slightly downward, it is separated away from the boss 11. The keyboard 4 is then pivoted in the direction d by the biasing force of the spring 9.

When the housing 2 is pivoted in the direction c, the support member 15 is pivoted in the direction a, and is engaged with the support base 12 to cause it to pivot in the direction b. Furthermore, the distal end portion of the support member 15 is engaged with the lower corner portion of the free end portion (the right end portion in FIG. 1) of the keyboard 4 to press it slightly upward, thus establishing the tilt state shown in FIG. 2.

In the tilt state shown in FIG. 2, the keyboard 4 is apt to be pivoted in the direction h by its weight and the tensile force of the expanded spring 9. However, since the support member 15 supported on the support base 12 is engaged with the keyboard 4, the keyboard 4 cannot be pivoted, and is supported in a state wherein it is inclined downward from the rear side to the front side, as shown in FIG. 2. In this state, the keyboard 4 can be operated to use the electronic equipment. In this state, an operator can observe a display of the display unit 1 which obliquely stands, as a matter of course.

In order to set the closed state from the tilt state shown in FIG. 2, the housing 2 of the display unit 1 is pivoted in the direction e in FIG. 2. Upon this pivotal movement, the support member 15 is pivoted in the direction f while causing the support base 12 to be pivoted in the direction g, and is disengaged from the keyboard 4. Thus, the keyboard 4 is pivoted in the direction h by its weight and the tensile force of the spring 9, and is pivoted to an almost horizontal position, as shown in FIG. 1. At this time, the keyboard 4 is not pivoted to a horizontal state due to the repulsion force of the spring 9 which is compressed upon this pivotal movement.

When the housing 2 is further pivoted in the direction e, the pressing portion 10 of the housing 2 is brought into contact with the boss 11 of the keyboard 4, and presses it downward. As a result, the keyboard 4 is pivoted in the direction h to the horizontal state, thus establishing the closed state shown in FIG. 1.

Figure 3:
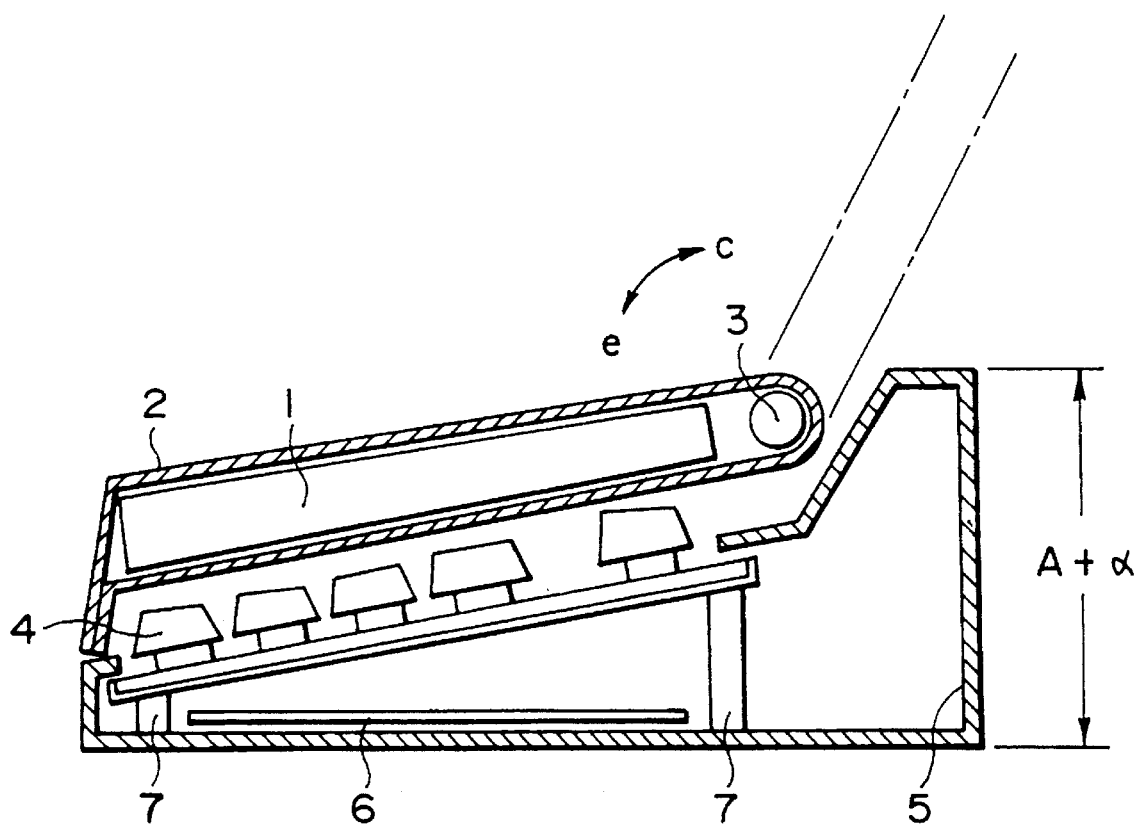
FIG. 3 is a schematic sectional view of a closed state of a conventional electronic equipment.

According to the present invention, as described above, since the keyboard 4 is held in a horizontal state with respect to the main body housing 5 in the closed state shown in FIG. 1, an increase in height α due to inclination of the keyboard 4 in the tilt state need not be added to the total height of the electronic equipment in the closed state, unlike in the prior art shown in FIG. 3. Thus, the height of the electronic equipment can be decreased by α from the prior art, as indicated by A in FIG. 1. More specifically, a low-profile electronic equipment can be realized.

In the tilt state, i.e., in a use state shown in FIG. 2, since the keyboard 4 is supported to be inclined, good operability of the keyboard 4 can be assured.

The above-mentioned structure is not limited to a case wherein an operation input unit of electronic equipment comprises a keyboard but may be similarly applied to a case wherein an operation input unit comprises a touch panel, a coordinate input device, or the like.

As can be apparent from the above description, according to the present invention, electronic equipment having a display unit and an operation input unit employs the following structure. That is, the display unit is arranged to be pivotal between a state wherein it obliquely stands on an electronic equipment main body (tilt state), and a state wherein it is folded on the equipment main body (closed state), and the operation input unit is arranged to be pivotal between a state wherein it is inclined with respect to the electronic equipment main body, and an almost horizontal state. The operation input unit is interlocked with the pivotal movement of the display unit. When the display unit is pivoted to the tilt state, the operation input unit is pivoted to the inclined state. When the display unit is pivoted to the close state, the operation input unit is pivoted to the almost horizontal state. Therefore, when the display unit is folded on the electronic equipment main body, the operation input unit can be set in the almost horizontal state. Therefore, the height of the electronic equipment can be decreased, i.e., a low-profile structure of the electronic equipment can be attained. In addition, when the electronic equipment is used, the operation input unit is set in the inclined state, thus assuring good operability.

What is claimed is:

1. Electronic equipment comprising:
   key input means for inputting information, said key input means being pivotally supported about an axis and rotated within a very small angle to an inclined position during use;
   display means for displaying the information input by an operation of said key input means;
   support means for pivotally supporting said display means;
   biasing means for biasing said key input means in a first direction toward the inclined position when said display means covers said key input means; and pressing means for, when said display means is at a predetermined position, pressing said key input means toward the inclined position, thereby holding said key input means in the inclined position as said biasing means biases said key input means in a second direction substantially opposite to the first direction.

2. Electronic equipment according to claim 1, wherein said biasing means comprises a coil spring suspended between said key input means and said support means.

3. Electronic equipment according to claim 1, wherein said pressing means comprises a projecting portion on said display means, with said projecting portion disposed opposite to said key input means.

4. Electronic equipment according to claim 1, wherein said support means comprises a housing of a lower portion of an equipment main body.

5. Electronic equipment according to claim 2, wherein said support means comprises a housing of a lower portion of an equipment main body.

6. Electronic equipment according to claim 3, wherein said support means comprises a housing of a lower portion of an equipment main body.

7. Electronic equipment according to claim 1, wherein when said display means is pivoted to a non-use position, said key input means is pivoted to substantially a horizontal state with respect to said support means.

8. Electronic equipment according to claim 2, wherein when said display means is pivoted to a non-use position, said key input means is pivoted to substantially a horizontal state with respect to said support means.

9. Electronic equipment according to claim 3, wherein when said display means is pivoted to a non-use position, said key input means is pivoted to substantially a horizontal state with respect to said support means.

10. Electronic equipment comprising:

a main body;

key input means for inputting information, said key input means being provided in said main body and pivotally supported about an axis extending along a first side of said main body so as to be rotated within a very small angle to an inclined position during use;

display means for displaying the information input by said key input means;

a cover member supporting said display means and covering said key input means at an upper surface of said main body;

display support means for pivotally supporting said cover member at a location adjacent to said key input means and remote from said first side of said main body;

biasing means for biasing said key input means in the inclined position, said biasing means providing a biasing force in a first direction to bias said input means toward the inclined position when said cover member covers said input means; and holding means for, when said key input means is in use, holding said key input means at the inclined position as said biasing means biases said key input means in a second direction substantially opposite to the first direction when said display support means is pivoted.

11. Electronic equipment according to claim 10, wherein said holding means is pivoted together with said display means, and is brought into contact with said key input means when said key input means is in the inclined position.

12. Electronic equipment according to claim 10, wherein said support means comprises a housing of a lower portion of an equipment main body.

13. Electronic equipment according to claim 11, wherein said support means comprises a housing of a lower portion of an equipment main body.

14. Electronic equipment comprising:

key input means for inputting information;

display means for displaying the information input by an operation of said key input means;

support means for pivotally supporting said display means;

biasing means for biasing said key input means in a first direction toward an inclined position when said support means covers said key input means;

pressing means for, when said display means is at a first position, pressing said key input means to a non-inclined position in cooperation with a biasing force of said biasing means; and holding means for, when said display means is at a second position, holding said key input means in the inclined position as said biasing means biases said key input means in a second direction substantially opposite to the first direction.

15. An equipment according to claim 14, wherein a state wherein said display means is located at the non-inclined position forms a closed state wherein said display means covers upper surfaces of said support means and said key input means, and a state wherein said display means is located at the inclined position forms an open state wherein said display means is inclined with respect to said support means.

16. Electronic equipment according to claim 14, wherein said holding means is pivoted together with said display means, and is brought into contact with said key input means against a biasing force of said biasing means.

17. Electronic equipment according to claim 15, wherein said support means comprises a housing of a lower portion of said main body.

18. Electronic equipment according to claim 16, wherein said support means comprises a housing of a lower portion of said main body.

* * * * *

UNITED STATES PATENT AND TRADEMARK OFFICE
CERTIFICATE OF CORRECTION

PATENT NO. : 5,534,891
DATED : July 9, 1996
INVENTOR(S) : Hirokuni Takano

It is certified that error appears in the above-indentified patent and that said Letters Patent is hereby corrected as shown below:

On the title page:
[56] REFERENCES CITED:

OTHER PUBLICATION, "Huge" should read --Hinge--.

COLUMN 6:

Line 36, "An equipment" should read --Electronic equipment--.

Signed and Sealed this

Fourteenth Day of January, 1997

Attest:

BRUCE LEHMAN

Attesting Officer    Commissioner of Patents and Trademarks